United States Patent [19]

Stark

[11] Patent Number: 4,997,281

[45] Date of Patent: Mar. 5, 1991

[54] GRATING SPECTROMETER

[76] Inventor: Edward W. Stark, Suite 3M - 160 West End Ave., New York, N.Y. 10023

[21] Appl. No.: 398,094

[22] Filed: Aug. 24, 1989

[51] Int. Cl.[5] .............................................. G01J 3/18
[52] U.S. Cl. .................................... 356/328; 250/339
[58] Field of Search ............... 356/305, 328, 326, 319, 356/51, 331, 334; 250/339

[56] References Cited

U.S. PATENT DOCUMENTS

| | | | |
|---|---|---|---|
| 3,794,407 | 2/1974 | Nishimura | 350/171 |
| 4,036,558 | 7/1977 | Pouey | 250/226 |
| 4,264,205 | 4/1981 | Landa | 356/326 |
| 4,285,596 | 8/1981 | Landa | 356/308 |
| 4,568,187 | 2/1986 | Kita et al. | 356/328 |
| 4,636,074 | 1/1987 | Levy et al. | 356/328 |
| 4,650,321 | 3/1987 | Thompson | 356/328 |
| 4,718,762 | 1/1988 | Wiget et al. | 356/319 |
| 4,844,617 | 7/1989 | Kelderman et al. | 356/328 |

FOREIGN PATENT DOCUMENTS 62-47524A 3/1987 Japan.

OTHER PUBLICATIONS

Lasalle et al., Optics Communications, vol. 17, No. 3, Jun. 1976, pp. 326–327.

Primary Examiner—F. L. Evans
Attorney, Agent, or Firm—McAulay Fisher Nissen & Goldberg

[57] ABSTRACT

An improved flat field grating spectrometer for increasing the spectral resolutiion and usable spectral range. The spectrometer comprises an entrance slit or port, a concave grating, a field flattening lens and detection means encompassing the desired spectral region and capable of providing separate measurements between different regions of the spectral image plane. A second embodiment provides a beam splitter (dichroic or neutral density) placed between the grating and the detector to divert a portion of the energy at selected wavelengths through a second field flattening lens to a second detection means.

29 Claims, 2 Drawing Sheets

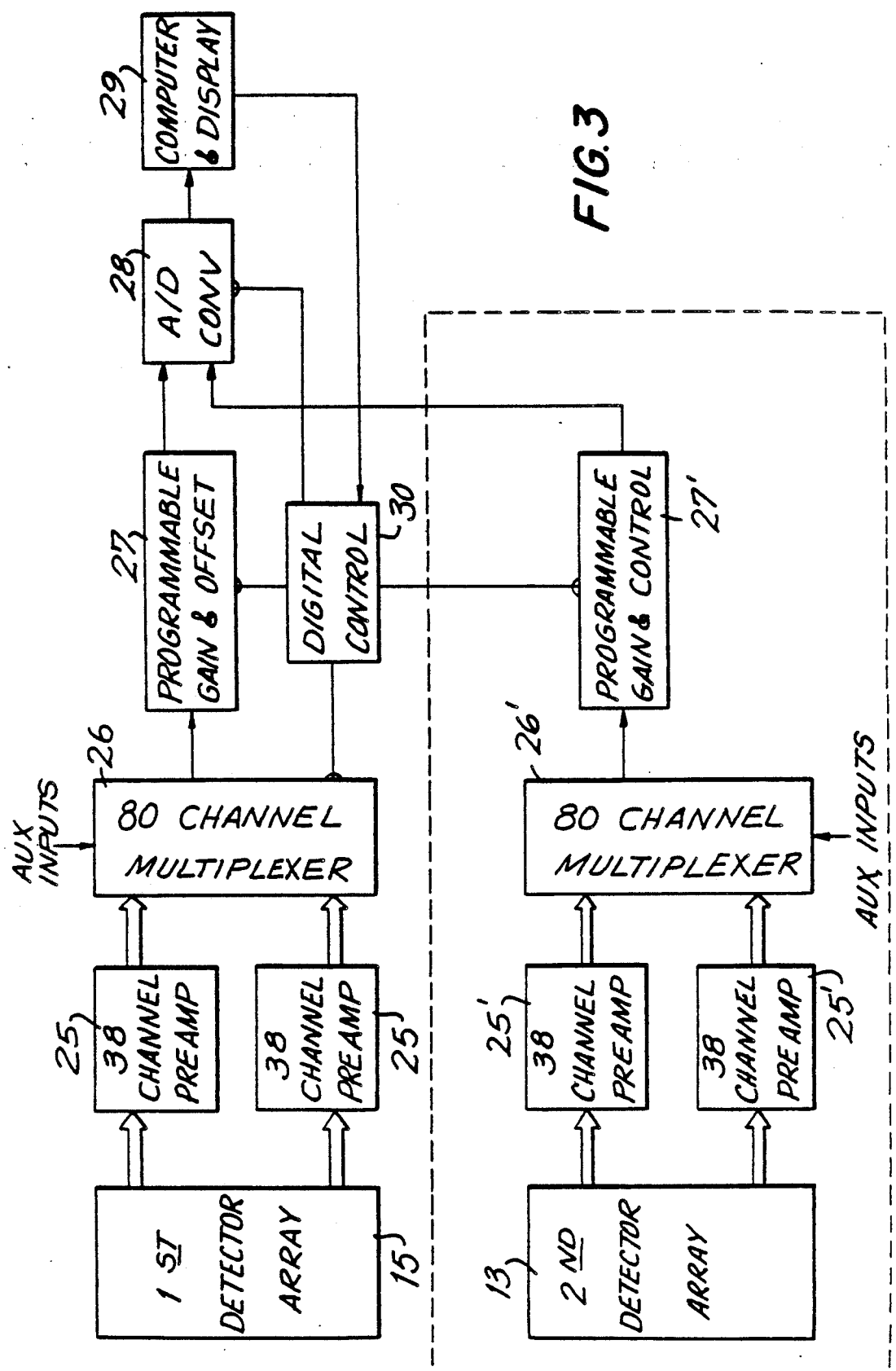

GRATING SPECTROMETER

FIELD OF THE INVENTION

The present invention relates to a grating spectrometer and, more particularly, to a flat field grating spectrometer of improved optical design which provides better spectral resolution and extended spectral range.

BACKGROUND OF THE INVENTION

Flat field grating spectrometers find wide application in many analytical instruments, such as spectrophotometers and colorimeters, used to practice spectroscopy in the ultraviolet, visible, near-infrared, and mid-infrared regions of the electromagnetic spectrum. A flat field, i.e., spectral image plane, is desirable when the detection means is flat, such as with diode array detectors, image intensifier tubes, or photographic plates. With development of aberration-corrected, concave holographic gratings, it became possible to design flat field spectrometer optical systems using the holographic grating as the only optical element between the entrance slit and the detector.

However to obtain such a flat field concave holographic grating, the usable image plane is tilted and displaced far from its preferred Rowland circle location. As a result, the linear dispersion varies a large amount from one end of the field to the other. This is a particular disadvantage for diode array detectors, which usually have equally spaced elements that then produce unequal spectral resolution across the field. The axis of the cone of energy incident at the detector is far from normal to the detector, complicating the design of order sorting filters.

Diode-array, concave holographic grating spectrometers have been made in which the entrance slit lies below the center of the spectral image plane, which is displaced above the plane containing the normal to the grating by the same distance as the entrance slit is below this plane. This design has two significant disadvantages. First, the spectral focus lies on a curved image surface, which limits the spectral range over which acceptable resolution can be obtained, and the out-of-plane design results in larger aberrations than those of an in-plane design. This factor limits the spectral resolution obtainable, and, to a considerable extent, the throughput since the entrance slit height must be restricted to obtain reasonable resolution.

Other prior designs place the entrance slit and detector in-plane, with the slit located beyond the end of the spectral image plane. The holographic grating parameters are adjusted to provide minimal aberrations, including astigmatism, over a flat spectral field. These designs have good spectral resolution over only a limited spectral range.

To overcome problems of spectral resolution, prior spectrometers have often reduced the entendu (optical throughput) ($cm^2$-ster) by reducing the numerical aperture of the grating, the area of the entrance slit and detector element, or both. The resultant loss of energy reduces the signal-to-noise ratio obtainable in measuring spectroscopic data.

Prior flat field concave holographic grating instruments have used a single order of the grating, further limiting the usable spectral range. In many applications it is desirable to obtain simultaneous measurements extending over two spectral regions, e.g., the ultraviolet and visible or the visible and the near-infrared, which span a spectral range exceeding a two to one ratio of maximum to minimum wavelengths. In many cases, different detector arrays may be required for different spectral regions. Combining two different detector materials in a single array results in a gap between the two subarrays.

OBJECTS OF THE INVENTION

Accordingly, it is an object of the present invention to provide an improved flat field concave grating spectrometer which enables spectral measurements with better spectral resolution over a greater spectral range than hitherto possible, while maximizing the energy throughput.

It is another object of the invention to provide a method and apparatus for efficient, simultaneous use of two detector arrays which measure the spectral energy in two different spectral regions.

It is yet another object of the invention to provide a method and apparatus for efficient, simultaneous use of two different grating orders enabling use of an additional spectral region without increased optical aberrations and with improved spectral resolution in the higher order spectral image.

SUMMARY OF THE INVENTION

In accordance with the present invention, a flat field grating spectrometer having increased spectral resolution and usable spectral range comprises an entrance slit or port for selection of incident spectral energy to be measured and a concave holographic grating for receiving the spectral energy from said slit or port and for dispersing and imaging the incident spectral energy. Also included is a field flattening lens for flattening the field or spectral image surface of the energy dispersed and imaged by the grating. Detector means are included in the form of a planar array of detecting elements for detecting and providing signals representative of the spectral energy distribution in the flattened spectral image plane as a function of position and, therefore, as a function of wavelength.

The invention also encompasses use of a beam splitter which divides the energy between two spectral image planes by transmitting part of the energy to the original spectral image plane while reflecting part of the energy to a second image plane. In this arrangement, a second field flattening lens may be included and detector means is included for detecting and providing signals representative of the spectral energy distribution in said second flattened spectral image plane simultaneously in time with the detection of the energy distribution in said first spectral image plane by said first detector means.

Alternatively, the beam splitter may be an electro-optical device which reflects or transmits energy in response to the application of electrical or magnetic fields, thereby time sharing the two detector means. The effective energy ratio between the two detector means may then be controlled by the duty cycle of the electro-optical mirror.

For a better understanding of the present invention, reference is made to the following description and accompanying drawings while the scope of the invention will be pointed out in the appended claims.

BRIEF DESCRIPTION OF THE DRAWINGS

In the drawings:

FIG. 3 is a schematic block diagram of the electronic circuitry for use in the first and second embodiments of the invention.

DESCRIPTION OF THE PREFERRED EMBODIMENTS

Figure 1:
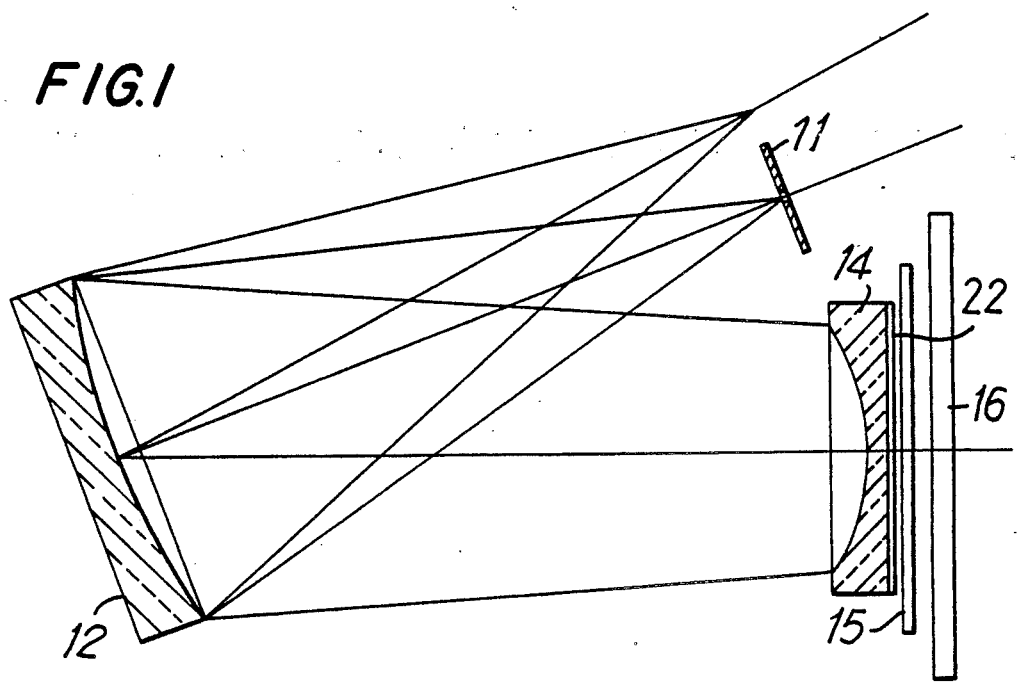
FIG. 1 represents a first embodiment of the flat field grating spectrometer in accordance with the invention.

Referring to FIG. 1, a flat field grating spectrometer in accordance with the present invention is shown. The spectrometer, in one embodiment, has a total spectral range of approximately 520–2200 nm.

The spectrometer includes an entrance slit or port 11 for selection of spectral energy to be measured and is typically 0.25×6.0 mm in size. The energy passes from the slit or port to a concave holographic grating 12 which is mounted at an angle (in one embodiment 0.368 radians) to a principal axis of a field flattening lens to be discussed further below. The concave holographic grating 12 receives the spectral energy from the slit or port and disperses and images this spectral energy. In a typical embodiment, the concave grating radius of curvature is 99.6 mm, the distance from the grating vertex to the entrance slit is 97.74 mm, the distance along the principal axis of the field flattening lens to the slit image is 108.0 mm and the grating has 244 grooves per mm. The energy imaged by the concave grating is directed to a field flattening lens 14, typically a plano-concave cylindrical lens made of SF10 glass with a concave radius of curvature of 32.75 mm, a 3 mm center thickness, and located with a center of curvature 105.75 mm from the grating vertex. The field flattening lens 14 redirects the spectral energy which has been dispersed and imaged by the grating onto a spectral image plane, typically 110.0 mm from the grating vertex.

After the energy has been redirected by the lens 14 so as to form a flat spectral image, it is directed through an order sorting filter 22 which transmits energy in the desired diffraction order and absorbs or reflects energy in other orders to which the detector means is responsive. This order sorting filter may comprise several regions with different wavelength characteristics as may be required to obtain the required order sorting function. After the energy is transmitted through the order sorting filter, it is directed to a planar arranged detector array 15 at the spectral image plane. The output of the detector array 15 (typically an array of photodiodes similar to the Advanced Optoelectronics ADC 801976 element silicon diode array) is directed to electronic processing equipment 16 comprising a preamplifier and low pass electronic filter associated with each detector element in the detector array and a multiplexer for sequentially sampling the output of each preamplifier-filter so as to time division multiplex the amplified and filtered output of all the array elements into a combined signal for further processing. In a preferred arrangement of the present invention, the preamplifiers, electronic filters, and multiplexers are combined in an electronic module mounted immediately in back of the detector array 15 to minimize the distance between the detector array elements and the preamplifier. Additional electronic processing, such as programmable gain and offset circuits, may be included in electronic processing equipment 16. In a preferred embodiment, the combined signal is then directed to an analog to digital converter (typically a Data Translation DT2823 unit) whereby it is converted to digital form for further processing and analysis by means of a digital computer, typically a Dell Model 310.

The arrangement described above enables the spectrometer to provide useful information of different parts of the spectral regions so as to provide increased spectral resolution and a more usable spectral range.

Figure 2:
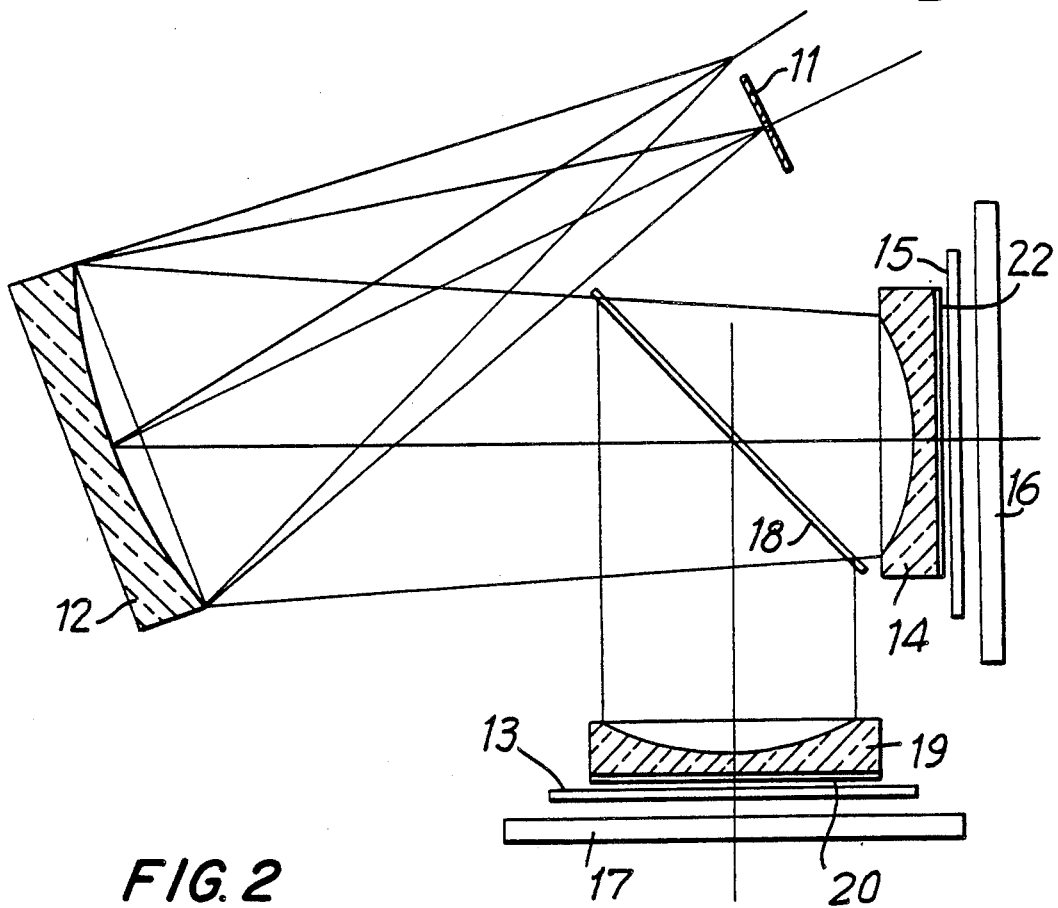
FIG. 2 illustrates a second embodiment of the invention with a second detector placed at an angle to the axis of the energy dispersed and imaged by the holographic grating.

In FIG. 2 another embodiment of the present invention is depicted. There, a beam splitter 18 is shown as it would be incorporated in a spectrometer such as that of FIG. 1 in the optical beam directed from the concave grating toward the field flattening lens 14. Such beam splitter 18 is not limited to use with a field flattening lens. A portion of the energy is passed through the beam splitter to the lens 14 while a portion is reflected and directed at an angle (preferably orthogonal) to the axis of the field flattening lens. This reflected energy is directed to a second field flattening lens 19, through a second order sorting filter 20, and then to a second detector array 13. A second electronic processing equipment 17, similar to 16, is mounted behind the second detector array.

In a preferred embodiment, the second detector array is formed of germanium photodiodes responsive from 1030 nm to 1800 nm. Indium gallium arsenide photodiodes may also be used for the second detector array and the first detector array is formed of silicon photodiodes responsive from 515 to 1100 nm. In a preferred arrangement the beam splitter 18 is a dichroic mirror which reflects substantially all the incident energy in a first spectral region while transmitting substantially all of the incident energy in a second spectral region. This dichroic mirror maximizes the efficiency for both spectral regions. Alternatively, a neutral beam splitter may be used which transmits a first fraction of the energy and reflects a second fraction of the energy, such fractions being substantially independent of the wavelength of the energy. The energy ratio of the neutral beam splitter may be chosen to provide substantially equal signals from the two arrays. In a preferred arrangement, the ratio of the energy reflected toward a germanium diode array to the energy transmitted to a silicon diode array is 86% to 14%, which ratio is selected to make the signals from the germanium array approximately equal to those from the silicon array, considering the energy distribution of a tungsten lamp source, the efficiency of the grating, the responsivity of the detectors, and the appropriate current to voltage transformation ratio of the preamplifiers for each array.

In one form of the invention, the beam splitter includes an optical element which is switched from reflective to transmissive by means of an electrical or magnetic field thereby being responsive to a signal to switch the optical beam between the first and second detector. When the beam is switched more rapidly than the response time of the pre-amplifier-filter, the effect is equivalent to dividing the energy with a neutral beam splitter; however, the ratio can be varied by changing the duty cycle of the switching.

In general, the principal axes of the grating and the field flattening lens are arranged so they lie in a plane and form an angle less than 45°, with the principal axis of the field flattening lens passing through or near the center of the grating. The entrance slit is located near, but not on, the principal axis of the grating, typically displaced 0.038 radians, so that the zero order image of the slit is also close to the principal axis of the grating and does not impinge on the walls of the housing. The holographic grating parmeters are constrained during the process of design to obtain the desired spectral resolution and spectral range.

In a preferred arrangement of the circuitry of the present invention, shown in FIG. 3, portions 25' of the electronics preamplifier 17 are the same as the preamplifier portions 25 of electronics 16. It is a hybrid circuit assembly containing 19 dual operational amplifiers (typically Analog Devices type AD648), each with a feedback resistor and capacitor, operating in the current to voltage transformation mode to provide 38 channels. The feedback resistor and parallel capacitor establishes the time constant or high frequency rolloff of the preamplifier response, typically at 1.6 milliseconds time constant which yields a 100 Hertz high frequency rolloff. Two preamplifier modules (25 or 25') are used with each 76 element detector array, or one with a 38 element array. Electronics 16 also includes an 80 channel multiplexer hybrid circuit 26 (typically using five ADG 526 analog multiplexers) which time multiplexes the 76 outputs of two preamplifiers (plus 4 reference or test signals) in a single output channel. The multiplexer 26 has 80 low pass input filters consists of a resistor and capacitor to signal to further limit the signal bandwidth, typically with a time constant of 4 ms. The multiplexing is digitally controlled from an external source (30). A high speed operational amplifier (e.g. an AD 744) voltage follower buffers the signal. When two 76 element arrays are used, there are two electronic modules, each consisting of a multiplexer and two preamplifier hybrids. Optionally, a programmable gain and offset amplifier 27 may be incorporated to adjust the zero reference and magnitude of the signal. Similar units (multiplexer 26' and amplifier 27') are provided in the second channel. The output signal is supplied to an A/D converter 28 whose output is provided to computer and display 29 under control of digital control 30.

As described above, the spectrometer of the present invention provides increased spectral resolution by the addition of the field flattening lens so that the entrance slit is accurately focused on the flat diode array. Without the lens, the aberration corrected holographic grating parameters must be compromised to obtain a relatively flat field. In general, such a design has a flat field over only a limited spectral range. If this limited spectral range in satisfactory, the design does not receive use of a filed flattening lens. By use of a field flattening lens, the geometry can be arranged so that the line normal to the plane of the array at its center passes through or near the vertex of the grating. Unlike prior flat field designs, this geometry provides substantially constant dispersion, i.e. constant spectral resolution, with equally spaced detector elements. A more than 2:1 range of wavelengths can be covered by this approach. The geometry also allows use of a beam splitter to provide a second image plane, which would not generally be feasible with prior flat field designs due to the large angle of incidence of light at the detector array. Another detector array, located at this second image plane, can measure in another order of the grating than the first, even if the orders are overlapped. In this case, separate order sorting filters are employed, one in front of each detector array after the beam splitter.

While the foregoing description and drawings represent the preferred embodiments of the present invention, it will be obvious to those skilled in the art that various changes and modifications may be made therein without departing from the true spirit and scope of the present invention.

What is claimed is:

1. A flat field grating spectrometer having increased spectral resolution and usable spectral range comprises:
   an entrance slit or port for selection of incident spectral energy to be measured;
   a concave holographic grating for receiving said spectral energy from said slit or port and for dispersing and imaging the incident spectral energy;
   a field flattening lens for flattening the field of the energy dispersed and imaged by said grating; and
   detector means for measuring the flattened spectral image provided by said field flattening lens, said detector means being in the form of a planar array of detecting elements for providing signals responsive to said flattened spectral image.

2. A spectrometer in accordance with claim 1, also including an order sorting filter for transmitting energy in a desired diffraction order and absorbing or reflecting energy in other orders to which the detector means is responsive.

3. A spectrometer in accordance with claim 1 wherein said detector means includes a beam splitter placed in the path of energy directed to said field flattening lens from said grating, said beam splitter allowing a portion of the energy incident on said beam splitter to pass to said field flattening lens and a portion of said energy incident on said beam splitter to be reflected; a further field flattening lens for redirecting said reflecting energy and a further detector array responsive to said reflected energy also being included.

4. A spectrometer in accordance with claim 3 wherein said beam splitter is of the dichroic kind.

5. A spectrometer in accordance with claim 3 wherein said beam splitter is a neutral beam splitter.

6. A spectrometer in accordance with claim 5 wherein the ratio of energy transmission is adjusted to substantially equalize the signals provided from the detector arrays.

7. A spectrometer in accordance with claim 3 wherein said beam splitter includes an optical element which reflects or transmits optical energy in response to a signal to switch between said detector arrays.

8. A spectrometer in accordance with claim 7 wherein said optical element in said beam splitter is an electro-optically active material.

9. A spectrometer in accordance with claim 1 wherein said field flattening lens and grating each have a principal axis respectively, the angle being formed between said principal axes being less than 45°.

10. A spectrometer as in claim 1 wherein the grating has a principal axis and the entrance slit is located near the principal axis of the grating so that the zero order image of the slit is close to the principal axis of the grating.

11. A spectrometer in accordance with claim 1 also including electronic processing means responsive to the signal from said array of detecting elements of said detector means.

12. A spectrometer in accordance with claim 11 wherein said electronic processing means includes a preamplifier and multiplexer.

13. A spectrometer in accordance with claim 3 wherein said first mentioned detector array is formed of silicon photodiodes and said further detector array is formed of germanium or indium gallium arsenide photodiodes.

14. A spectrometer in accordance with claim 3 wherein said first mentioned detector array is responsive within the range of wavelengths from 515 to 1100 nm while the further detector array is responsive within the range of wavelengths from 1030 to 1800 nm.

15. A spectrometer in accordance with claim 3 wherein said first mentioned detector array is responsive to one order of said grating and said further detector array is responsive to a second order of said grating.

16. A spectrometer comprising:
   an entrance slit or port for selection of incident spectral energy to be measured;
   a concave holographic grating for receiving said spectral energy from said slit or port and for dispersing and imaging the incident spectral energy;
   first detector means for measuring a spectral image and for providing first signals responsive thereto;
   a beam splitter placed in the path of energy directed toward said first detector means from said grating for creating first and second spectral images, said beam splitter allowing a portion of the energy incident on said beam splitter to pass to said first detector means as said first spectral image and a portion of said energy incident on said beam splitter to be reflected as said second spectral image; and
   second detector means responsive to the reflected energy of said second spectral image from said beam splitter for providing second signals responsive to said second spectral image.

17. A spectrometer in accordance with claim 16 wherein the energy transmitted by said beam splitter is adjusted with respect to the reflected energy so that the magnitude of the signals from the first and second detectors are equal.

18. A spectrometer in accordance with claim 16 also including an order sorting filter for transmitting energy in a desired diffraction order and absorbing or reflecting energy in other orders to which the detector means is responsive.

19. A spectrometer in accordance with claim 16 wherein said beam splitter is of the dichroic kind.

20. A spectrometer in accordance with claim 16 wherein said beam splitter is a neutral beam splitter.

21. A spectrometer in accordance with claim 20 wherein the ratio of energy transmission is adjusted to substantially equalize the signals provided from the first and second detector means.

22. A spectrometer in accordance with claim 16 wherein said beam splitter includes an optical element which reflects or transmits optical energy in response to a signal to switch between said first and second detector means.

23. A spectrometer in accordance with claim 22 wherein said optical element in said beam splitter is an electro-optically active material.

24. A spectrometer as in claim 16 wherein the angle between a normal to the first detector means and the grating is less than 45°.

25. A spectrometer as in claim 16 wherein the grating has a principal axis and the entrance slit is located near the principal axis of the grating so that the zero order image of the slit is close to the principal axis of the grating.

26. A spectrometer in accordance with claim 16 wherein said first and second detector means include a first and second array of detecting elements respectively and wherein electronic processing means responsive to the signal from each said array of detecting elements are included.

27. A spectrometer in accordance with claim 26 wherein said electronic processing means includes a preamplifier and multiplexer.

28. A spectrometer in accordance with claim 16 wherein said first detecting means includes a first array of detecting element and said second detecting means include a second array of detecting elements and wherein said first detector array is formed of silicon photodiodes and said second detector array is formed of germanium or indium gallium arsenide photodiodes.

29. A spectrometer in accordance with claim 16 wherein said first detecting means includes a first array of detecting element and said second detecting means include a second array of detecting elements and wherein said first detector array is responsive within the range of wavelengths from 515 to 1100 nm while the second detector array is responsive within the range of wavelengths from 1030 to 1800 nm.

* * * * *